June 22, 1948.  G. J. BOHRER  2,443,887
WAX RESIN COMPOSITIONS AND CONDUCTORS
INSULATED THEREWITH
Filed July 4, 1945

Fig. 1.

CONDUCTOR

INSULATION COMPRISING PERMEABLE
MATERIAL, E.G., ASBESTOS, COATED
AND AT LEAST PARTLY IMPREGNATED
WITH A COMPOSITION COMPRISING A
CHLORINE-CONTAINING RESIN AND A
CHLORINE-CONTAINING WAX.

Fig. 2.

SHEET OF PERMEABLE MATERIAL, E.G., ASBESTOS,
COATED AND AT LEAST PARTLY IMPREGNATED WITH
A COMPOSITION COMPRISING A CHLORINE-CONTAIN-
ING RESIN AND A CHLORINE-CONTAINING WAX.

Inventor:
George J. Bohrer,
by
His Attorney.

Patented June 22, 1948

2,443,887

UNITED STATES PATENT OFFICE 2,443,887

WAX RESIN COMPOSITIONS AND CONDUCTORS INSULATED THEREWITH

George J. Bohrer, Troy, N. Y., assignor to General Electric Company, a corporation of New York Application July 4, 1945, Serial No. 603,239

14 Claims. (Cl. 174—121)

This invention relates to new and useful compositions of matter and more particularly is concerned with compositions comprising a homogeneous mixture of a halogen-containing resin and a halogen-containing wax, specifically a chlorine-containing resin and a chlorine-containing wax.

It may be stated with greater particularity that the invention relates to compositions comprising (1) a synthetic wax obtained by effecting reaction, as by heating, between a primary amine, e. g., propyl amine (monopropyl amine), tetradecyl amine, aniline, etc., and a halogenated compound, more particularly a chlorinated compound, which is selected from the class consisting of halogenated, specifically chlorinated, phthalic acids and anhydrides, e. g., mono-, di-, tri- and tetrachlorophthalic acid and anhydride, and mixtures thereof, and (2) a resinous composition comprising the product of reaction of ingredients including a glycol, e. g., ethylene glycol, and a halogenated compound, more particularly a chlorinated compound, as defined in (1), said reaction product having incorporated therein a modifying substance selected from the class consisting of (a) fatty oils, (b) fatty acids having from 10 to 33 carbon atoms, inclusive, more specifically from 14 to 30 carbon atoms, inclusive, and (c) fats and waxes containing in free or combined state (e. g., as esters) the fatty acids defined in (b). The resinous composition of (2) is thermoplastic and is compatible with the synthetic wax of (1). The resin imparts toughness, flexibility, abrasion- and moisture-resistance, as well as film-forming properties, to the wax-resin composition. The synthetic wax imparts waxiness, workability and smoothness to the composition and to permeable materials, e. g., asbestos-covered fixture wire, coated and impregnated therewith. The wax also decreases the viscosity of the wax-resin composition at the temperature of impregnation. Both the resin and the wax impart flame resistance to the composition.

Compositions having marked flame resistance are obtained when the synthetic wax is one obtained by effecting reaction between tetrachlorophthalic acid or anhydride (or mixtures thereof) and a primary amine having from 1 to 18 carbon atoms, inclusive, more particularly up to 12 carbon atoms, inclusive, and the resinous composition is one resulting from the reaction of ingredients including tetrachlorophthalic acid or anhyride (or mixtures thereof), a glycol and a modifier such as defined above, the chosen glycol and modifier and the proportions of glycol, tetrachlorophthalic acid or anhydride (or mixtures thereof) and modifier being such that the said composition contains at least 30 per cent by weight of chlorine. The modifying substance used in the preparation of the resinous component is incorporated with the glycol and chlorinated compound under heat, and at least in part is chemically combined in the final product. In making the wax, the reactants are employed in substantially equivalent molar proportions or with a slight molar excess of the amine reactant.

Flameproof saturating compounds for impregnating permeable materials, e. g., asbestos-covered fixture wire, are of two general classes: hot-melt compounds and solution-type impregnants. The hot-melt compounds are applied by drawing the wire, loosely covered with carded asbestos, through the liquid compound at an elevated temperature, usually about 130° to 150° C., and subsequently cooling and polishing the wire. By this method the finished wire contains more saturating compound per unit volume than results from the solution method. Hence the requirements of flame resistance, waxiness and flexibility of the insulated wire are most severe.

In general, the requirements of a satisfactory hot-melt impregnating compound for such applications as described in the preceding paragraph are as follows:

1. It should should be waxy with a dry feel.
2. It must have a very low viscosity at 150° C.
3. It must be thermoplastic.
4. It should have a low volatility (low loss by vaporization) at 150° C.
5. It must be non-toxic.
6. It must be chemically stable at elevated temperatures. There should be neither a marked increase in viscosity nor any chemical decomposition at temperatures of the order of 150° C. or thereabouts.
7. It should have a relatively low acid number.
8. It is desirable that it have a relatively high melting point, e. g., 80° to 120° C.

The finished, insulated wire must be sufficiently flexible at 0° C. that it can be bent around its own diameter at this temperature without cracking of the insulation to the conducting core, e. g., copper wire. The flame resistance should be sufficient to pass the tests of Underwriters' Laboratories, Inc., for the flame-resisting properties of impregnated asbestos insulation. Preferably the flame resistance is such that a vertical length of insulated wire extinguishes its own flame after one 15-second application of a Bunsen-burner flame 5 inches high with an inner blue cone 1½ inches high. The insulation must be tough and have good electrical properties, more particularly high dielectric strength and good insulation resistance. The insulation must be free from tackiness, and should have a dry, waxy feeling.

The difficulty in the past in the production of hot-melt impregnating compounds has been that a compound meeting some of the above-mentioned requirements would fail to meet other requisites. For example, flame-resisting impregnants comprising chlorinated naphthalenes or chlorinated biphenyls have been more or less satisfactory in all respects with the exception of the non-toxicity requirement.

I have discovered that non-toxic, thermoplastic compositions suitable for use as impregnants and for a wide variety of other applications can be produced by compounding a chlorine-containing resin and a chlorine-containing wax of the kinds broadly described in the second paragraph of this specification. Surprisingly it was found that, when tested on rats, the compositions of this invention are non-toxic physiologically from contact, from ingestion or from absorption through the lungs of the vapors resulting from heating these compositions. This non-toxic property was entirely unexpected and in no way could have been predicted, since it is in striking contrast to the known toxicity of compositions comprising other chlorinated aromatic compounds, more particularly the chlorinated naphthalenes and chlorinated biphenyls. Since the rat in many of its physiological reactions has been found closely to parallel man, the practical significance of my discovery will be immediately apparent to those skilled in the art.

I have further discovered that impregnating compounds meeting all of the above-mentioned requirements, including non-toxicity, and which are adapted for use either as hot-melt impregnants or, when dissolved in a solvent, as solution-type impregnants, can be produced by suitable selection of the starting components in the preparation of the resin and wax, by suitably proportioning the resin and wax, and by incorporating into the compound a suitable amount, e. g., from about 5 to 25 per cent by weight of the compound, usually about 7 to 15 per cent by weight thereof, of a suitable plasticizer, more particularly a flame-resisting plasticizer such, for instance, as tricresyl phosphate. The plasticizer imparts flexibility, especially at low temperatures, e. g., 0° C., to the compound and to flexible, permeable materials, e. g., fibrous materials, impregnated therewith; and, in the case of an impregnated asbestos-covered or glass fiber-covered conductor, e. g., copper wire makes it possible for the finished wire to be bent around its own diameter without cracking of the insulation to the copper.

In producing impregnating compounds of the kind described in the preceding paragraph I have found it desirable to use resins and waxes prepared from highly chlorinated phthalic acid or anhydride. More particularly it is advantageous to use tri- or tetra-chlorophthalic acid or anhydride, or mixtures thereof, or mixtures containing an average of at least three chlorine atoms per molecule of the acid or anhydride. I prefer to employ tetrachlorophthalic acid or anhydride, and generally use tetrachlorophthalic anhydride since it is now more readily available than the corresponding acid. For optimum flame resistance the resin and wax should be so chosen and so proportioned that the mixture thereof contains at least about 35 per cent by weight of chlorine. Products having some degree of flame resistance are obtained when the mixture contains as little as about 30 per cent by weight of chlorine, but the flame resistance of such products is appreciably less than that of mixtures containing, say, 35 per cent or more by weight of chlorine. Either the resin or the wax may contain above or below 35 per cent by weight of chlorine, providing the proportions of wax and resin are adjusted to yield a wax-resin mixture containing about 35 per cent by weight of chlorine.

A particularly useful impregnating compound of this invention comprises, by weight, (1) about 35 to 45 per cent, more particularly about 40 per cent, of a synthetic wax obtained by effecting reaction under heat, more particularly until an acid number not substantially exceeding 35 has been obtained, between tetrachlorophthalic anhydride (or tetrachlorophthalic acid) and a mixture of primary monoamines including essentially a plurality of monoamyl amines having an initial boiling point of at least 84° C., at least 95 per cent distilling off below 100° C. and a final boiling point not higher than 110° C.; (2) about 45 to 55 per cent, specifically about 50 per cent, of the resinous product of reaction of ethylene glycol, tetrachlorophthalic anhydride and stearic acid, said resinous reaction product being compatible with the synthetic wax of (1); and (3) tricresyl phosphate constituting the remainder. Such an impregnating compound meets the requirements set forth in the fifth paragraph of this specification, both as to the compound per se and to permeable materials, e. g., asbestos-covered fixture wire, impregnated with the compound either in molten state or in solution in a volatile solvent, e. g., solvent naphtha, toluene, etc., followed by baking of the coated and impregnated wire to volatilize the solvent.

In the accompanying drawing are shown by way of illustration sectional views of different articles containing the new wax-resin compositions of this invention. Fig. 1 is a cross-sectional view of an insulated electrical conductor comprising a conducting core, e. g., copper wire, enveloped by insulation comprising permeable material, more particularly fibrous material such as paper, or cotton, silk, nylon, rayon, glass fibers, asbestos, mineral wool, etc., in thread, felted, fabric or other form, said permeable material being coated and at least partly impregnated with my new wax-resin composition; and Fig. 2 is a similar view of a sheet of permeable material, e. g., sheet asbestos, coated and at least partly impregnated with the wax-resin composition of this invention.

In order that those skilled in the art better may understand how the present invention may be carried into effect, the following examples are given by way of illustration and not by way of limitation. All parts and percentages are by weight.

EXAMPLE 1

A. Preparation of wax

In the following formula the "mixture of monoamyl amines" refers to a product having the following specification:

Color _____ Water-white
Specific gravity at 20° C. _____ 0.76–0.78
Water dilution _____ At least 20:1
Monoamyl amine content _____ At least 90%
Distillation:
    Initial boiling point _____ Not below 84° C.
    Not less than 95% _____ Below 100° C.
    Final boiling point _____ Not above 110° C.

It is a mixture of the various monoamyl amines including:

| | Approximate boiling point, °C. |
|---|---|
| Tertiary amyl amine | 82 |
| Secondary isoamyl amine | 87 |
| 2-aminopentane | 89 |
| 3-aminopentane | 90 |
| Active amyl amine | 94 |
| Isoamyl amine | 95 |
| Normal amyl amine | 104 |

| | Parts |
|---|---|
| Inert diluent, comprising a mixed aliphatic aromatic hydrocarbon solvent described below | [1]1,750 |
| Tetrachlorophthalic anhydride | 1,750 |
| Mixture of monoamyl amines | [2]550 |

NOTES

[1] This hydrocarbon solvent has the following specifications:
  Specific gravity (15.5/15.5° C.) _____ 0.820–0.830
  Distillation:
    Initial boiling point, maximum _____ 90° C.
    90% distilled off, maximum _____ 128° C.
    End point, maximum _____ 140° C.
    Aniline No., maximum _____ 22° C.

[2] This amount of the mixture of monoamyl amines provides about 3.4% excess over that theoretically required for reaction with tetrachlorophthalic anhydride to form a mixture comprising N-substituted tetrachlorophthalimides.

The above ingredients were added, in the order given, to a reaction vessel provided with stirring apparatus and a reflux condenser. The tetrachlorophthalic anhydride was dispersed with stirring in the inert diluent, after which the mixture of monoamyl amines was added with vigorous stirring to the closed vessel at such a rate that there was no loss of amine from the condenser. The ingredients were heated together under reflux at the boiling temperature of the mass for about 2 hours. The water of reaction, diluent and any unreacted amine were removed by distillation at atmospheric pressure. When the liquid temperature had reached about 145° to 150° C., vacuum was gradually applied while maintaining the temperature of the mass at about 140° to 145° C. When no more distillate could be obtained, the reaction product was withdrawn from the reaction vessel and allowed to solidify. The solid material was a synthetic wax containing about 40 per cent combined chlorine and having an acid number of 32 (with phenol red as indicator) and a solidification point of 128°–130° C. Such waxes are claimed in my copending application Serial No. 603,240, filed concurrently herewith and assigned to the same assignee as the present invention.

B. Preparation of resin

| | Approximate per cent |
|---|---|
| Tetrachlorophthalic anhydride | 66.0 |
| Ethylene glycol | 18.75 |
| Stearic acid (commercial grade) | 14.95 |
| Triphenyl phosphite [1] | 0.3 |

[1] The triphenyl phosphite is an oxidation inhibitor and aids in preventing discoloration of the resin.

The above ingredients were heated together under a nitrogen atmosphere at about 140° to 160° C. for about ½ to 1 hour, after which the temperature was raised gradually over a period of about ½ to 1 hour to about 200° to 210° C. The reaction was continued at this higher temperature until a resin having an acid number of about 10 was obtained, requiring about 7 hours' heating at such temperature. The resin had a penetration of 34 (200 gram weight, 5 seconds, 25° C.; method: A. S. T. M. designation D5–25).

C. Preparation of wax-resin composition

| | Per cent (approximately) |
|---|---|
| Wax of A | 40 |
| Resin of B | 50 |
| Flame-resisting plasticizer, specifically tricresyl phosphate | 10 | were compounded together by adding the wax to the hot, melted resin, followed by the plasticizer, and thoroughly stirring the mass to form a homogeneous mixture.

The plasticized wax-resin composition was tested on rats. It was found to be non-toxic physiologically from contact, from ingestion and from absorption through the lungs of vapors resulting from heating the composition. It had a specific gravity of 1.45 at 25° C., a brittleness point of 60 at 0° C. (method: A. S. T. M. designation D176–42T) and the following other characteristics:

| | °C. |
|---|---|
| Melting point 30 minutes after preparation of sample | 101 |
| Melting point 2½ hours after preparation of sample | 101 |
| Melting point 19 hours after preparation of sample | 100 |

Saybolt Furol viscosity:

| Temp., °C. | Seconds |
|---|---|
| 114 | 28.8 |
| 136 | 16.2 |
| 150 | 13.8 |
| 164 | 13.0 |

| | |
|---|---|
| Penetration [1] 2½ hours after preparation of sample | 25 |
| Penetration [1] 5 hours after preparation of sample | 24 |
| Penetration [1] 24 hours after preparation of sample | 22 |

[1] 100 gram weight, 5 seconds, 25° C.

Saturation tests were made on short lengths of 150,000 circular mil cable wound with two servings of asbestos roving. The cable samples were heated to 125° C. prior to immersion in the composition heated to 150° C. After only 15 seconds' immersion both servings were saturated. After 30 seconds' immersion there was slightly more compound on the inside surface of the inner serving than shown by the specimen immersed for 15 seconds.

EXAMPLE 2

| | Per cent (approximately) |
|---|---|
| Wax of 1–A | 41 |
| Resin of 1–B | 50 |
| Tricresyl phosphate | 9 | were compounded as described under Example 1. Asbestos-covered fixture wire was impregnated with this composition. The finished wire had a dry, waxy feeling and good flame resistance. It had an average dielectric strength, after aging for several days, of 3,000 volts upon the application of an alternating potential between the conductor and metal foil wrapped around the insulation. It also had good insulation resistance.

EXAMPLE 3

Same as in Example 2 with the exception that approximately 40% wax, 49% resin and 11% tricresyl phosphate were used. The finished wire had physical and electrical properties similar to the corresponding product of Example 2.

EXAMPLE 4

A. Preparation of wax

| | Parts |
|---|---|
| Tetrahlorophthalic anhydride | 286 |
| Commercial grade of dodecyl amine | 185 |

The above ingredients were heated together under a stream of nitrogen in a closed reaction vessel, the temperature being raised gradually over a period of 2 to 3 hours to 190° to 200° C. At the end of this reaction period, the product had an acid number of about 15. The crude product, which comprised N-dodecyl tetrachlorophthalimide, was a waxy substance having a fibrous, crystalline structure. It was neither brittle nor soft, but had physical properties intermediate between these extremes. It contained approximately 31.4 per cent by weight of chlorine. It was flame-resisting, and had a solidification point of 125°–128° C.

B. Preparation of resin

| | Per cent (approximately) |
|---|---|
| Ethylene glycol | 17.0 |
| Tetrachlorophthalic anhydride | 72.3 |
| Coconut oil fatty acids | 10.7 | were cooked together under a nitrogen atmosphere at 140°–160° C. for ½ hour, after which the temperature was raised to 200°–210° C. The reaction was continued at this higher temperature until a resinous product having an acid value of 10 was obtained. The total reaction period was 17 hours.

C. Preparation of wax-resin composition

| | Per cent (approximately) |
|---|---|
| Wax of A | 60 |
| Resin of B | 25 |
| Tricresyl phosphate | 15 | were compounded together in essentially the same manner described under Example 1. Asbestos impregnated with this composition was flame-resisting and had a dry finish.

EXAMPLE 5

A. In this example the same wax was used as described under the preceding example.

B. Preparation of resin

| | Per cent (approximately) |
|---|---|
| Ethylene glycol | 17.7 |
| Tetrachlorophthalic anhydride | 74.3 |
| Stearic acid (commercial grade) | 8.0 | were heated together as in Example 4–B until a resin having an acid number of 8 was obtained, requiring a total heating period of 16 hours.

C. Preparation of wax-resin composition

| | Per cent (approximately) |
|---|---|
| Wax of 4–A | 60 |
| Resin of B | 25 |
| Tricresyl phosphate | 15 | were mixed together as described under Example 1. Asbestos impregnated with the resulting composition was flame-resisting and had a dry finish.

EXAMPLE 6

A. Preparation of wax

| | Parts |
|---|---|
| Tetrachlorophthalic anhydride | 286 |
| Commercial grade of octadecyl amine | 269 |

The above ingredients were caused to react under conditions similar to the reaction conditions described under A of Example 4, yielding a waxy substance having a solidification point of 120°–122° C., but with other properties much the same as the wax of 4–A. However, its chlorine content is somewhat lower (about 26% as compared with approximately 31.4% for the 4–A wax), and hence its flame resistance is less.

B. The resin of 1–B was compounded with the above wax in making the wax-resin compositions described under C.

C. Preparation of wax-resin compositions

| | Per Cent (Approximately) | | | | |
|---|---|---|---|---|---|
| | (a) | (b) | (c) | (d) | (e) |
| Wax of A | 45 | 40 | 37.5 | 35 | 30 |
| Resin of 1–B | 45 | 50 | 52.5 | 55 | 60 |
| Tricresyl phosphate | 10 | 10 | 10.0 | 10 | 10 |
| Solidification point, °C | 106 | 104 | | 102 | 100 |
| Acid number | 10 | 10.5 | 11 | | |

The method of compounding was essentially the same as described under Example 1. Asbestos-covered fixture wire was impregnated with each of the above compositions. All had good flame resistance, with (a) being the best and the others with decreasing flame resistance as compared with (a). Compositions (a), (b), (c) and (d) yielded insulated wires having good, dry, waxy finishes, with (a) being the best. An insulated wire made with composition (e) was not so good from the standpoint of dryness and waxiness of finish as the others. In general, the series as a whole met the other requirements set forth in the fifth paragraph of this specification.

EXAMPLE 7

Preparation of wax-resin composition

| | Per cent (approximately) |
|---|---|
| Wax of 4–A | 60 |
| Resin of 1–B | 40 | were mixed together to yield a flame-resisting composition suitable for various impregnating and other applications. To improve its plasticity, tricresyl phosphate was then added in an amount sufficient to give in one case a product having a penetration (200 gram weight, 5 seconds, 25° C.) of 33 and, in another case, a product having a penetration of 42.

EXAMPLE 8

Preparation of wax-resin composition

| | Per cent (approximately) |
|---|---|
| Wax of 1–A | 45 |
| Resin of 1–B | 55 |

The above ingredients were mixed together, yielding a flame-resisting composition. Tricresyl phosphate was then added as described under Example 7 to give a product having a penetration (200 gram weight, 5 seconds, 25° C.) of 34.

Asbestos-covered fixture wire was impregnated with the plasticized wax-resin composition. The finish on the wire was excellent in its waxy, dry feeling. The flame resistance likewise was excellent. The electrical properties also were good, but the low-temperature flexibility was not so good as an asbestos-covered wire impregnated with the plasticized wax-resin composition of Example 1. The finished wire met the other requirements given in the fifth paragraph of this specification.

It will be understood, of course, by those skilled in the art that my invention is not limited to the specific waxes and resins given in the above examples. Thus, instead of the above-described waxes I may use, for example, a wax obtained by effecting reaction between tetrachlorophthalic anhydride, aniline and a mixture of monoamyl amines as described and claimed in my copending application Serial No. 603,240. Or I may use a wax such as described in the following example:

EXAMPLE 9

| | Parts |
|---|---|
| Inert hydrocarbon solvent (described in Example 1) | 150 |
| Tetrachlorophthalic anhydride | 143 |
| n-Butyl amine | 37 |

Essentially the same procedure was followed as described under Example 1—A. The product comprising N-n-butyl tetrachlorophthalimide was a very translucent, crystalline (large plate-like crystals), waxy solid having an acid number of 14.7 and a solidification point of 141°–144° C.

Instead of using resins and waxes made from tetrachlorophthalic anhydride, I may employ resins and waxes made from tetrachlorophthalic acid; or, where compositions of lesser flame resistance are suitable for the particular application, or where flame resistance is not an essential property, I may use resins and waxes made from mono-, di- or tri-chlorophthalic acid or anhydride, or mixtures of such mono-, di- and trichloro compounds, or mixtures of any or all with tetrachlorophthalic acid or anhydride.

Illustrative examples of other monoamines (primary amines) that may be used in the preparation of the wax are methyl amine, ethyl amine, methyl ethyl amine, isopropyl amine, isobutyl amine, hexyl amines, heptyl amines, octyl amines, nonyl amines, decyl amines, pentadecyl amines, hexadecyl amines, allyl amine, methallyl amine, tolyl amines, naphthyl amines, benzyl amine, alpha-phenylethyl amine, beta-phenylethyl amine, cinnamyl amine, octadecenyl amine, ethylphenyl amines, propylphenyl amines, chlorinated phenyl amines, e. g., mono-, di-, tri-, tetra- and pentachlorophenyl amines, chlorinated naphthyl amines, nuclearly chlorinated benzyl amines, cinnamyl amines, tolyl amines, phenylethyl amines, allylphenyl amines, etc. In the case of the nuclearly chlorinated aromatic, aliphatic-aromatic and aromatic-aliphatic amines, the number of chlorine atoms in the aromatic nucleus may range from 1 up to the combining power of the particular nucleus. I prefer to use a primary amine having from to 1 to 16 or 18 carbon atoms, inclusive, more particularly up to 12 carbon atoms, inclusive, and specifically from 3 to 12 carbon atoms, inclusive, since waxes made from such amines contain more chlorine and therefore have better flame resistance than waxes made from amines having a larger number of carbon atoms.

Instead of employing resins such as described in the above examples, I may use (depending, for example, upon the particular properties desired in the resin-wax composition and its particular application) resins such as described under Examples 5, 6, 7, 8, 9 and 11 of Nordlander and Cass application Serial No. 603,268, filed concurrently herewith and assigned to the same assignee as the present invention. I do not claim as my invention the resins used in making the wax-resin compositions herein described and claimed. More particularly it may be stated that my invention does not reside in a resinous product of reaction of ingredients including a glycol and tetrachlorophthalic acid or anhydride, which reaction product has incorporated therein, e. g., at least in part by chemical combination, a modifying substance selected from the class consisting of (1) fatty oils, (2) fatty acids having from 10 to 33 carbon atoms, inclusive, and (3) fats and waxes containing the fatty acids defined in (2). Such resinous reaction products are the invention of Birger W. Nordlander and William E. Cass and are claimed in the aforementioned Nordlander and Cass application.

The following example shows another resin that may be employed in my new wax-resin compositions:

EXAMPLE 10

| | Approximate per cent |
|---|---|
| Tetrachlorophthalic anhydride | 63.4 |
| Propylene glycol | 22.0 |
| Oleic acid | 14.3 |
| Triphenyl phosphite | 0.3 |

The above ingredients were heated together under a nitrogen atmosphere for 9½ hours at 200° to 210° C. The resulting flame-resisting resin had an acid number of 16 and a penetration value (200 gram weight, 5 seconds, 25° C.) of 68. Instead of using ethylene glycol or propylene glycol in preparing the resin, other glycols may be employed, e. g., diethylene glycol, triethylene glycol, tetraethylene glycol, dipropylene glycol, 1,3-butylene glycol, etc.

Various fats, waxes, fatty oils and fatty acids of the kind broadly described in the second paragraph of this specification may be used as the modifying substance in the preparation of the resin. Illustrative examples of such substances are: tung oil, soya bean oil, oiticica oil, castor oil, coconut oil, fish oils, perilla oil, cottonseed oil, sunflower oil, linseed oil, etc., the fatty acids of such fatty oils, capric acid, undecyclic acid, myristic acid, palmitic acid, margaric acid, arachidic acid, linoleic acid, linolinic acid, carnaubic acid, cerotic acid, lacceroic acid, montanic acid, melissic acid, psyllic acid, etc., tallow and other animal fats, beeswax, bayberry wax, carnauba wax, tristearin, vegetable stearin, specifically completely hydrogenated cottonseed oil, Japan wax, candelilla wax, palm wax, flax wax, cottonseed wax, spermaceti, etc.

In making the resin the proportions of reactants may be varied considerably, depending upon the particular properties desired in the resin and in wax-resin compositions made therefrom. Ordinarily the glycol is used in a slight molar excess, e. g., a 10 or 15% molar excess, of that required for reaction with the chlorinated phthalic acid or anhydride, but lower or higher amounts (e. g., as little as about 5% molar excess or as much as about 25% molar excess) may be employed depending, for instance, upon the kind and amount of modifying substance employed. The amount of modifier may be varied considerably, but usually will constitute from about 5 to 25% by weight of the total starting ingredients. When the resinous product is to be used in making wax-resin compositions where flame resistance is a property of considerable importance, for example as an impregnant of flame-resistant, insulated wires and cables, then the amount of modifier preferably is such that the amount of chlorine in the final resin is not below 30%, and preferably is from about 35 to 40% by weight of the resin.

It will be understood also that my invention is not limited to the particular proportions of wax and resin given in the above illustrative examples, since the proportions may be varied depending, for example, upon the particular wax and resin employed, the kind and amount of plasticizer, if any, that is used, the properties desired in the wax-resin composition, and the particular application in which the plasticized or unplasticized wax-resin composition is to be employed. Ordinarily, however, the wax and resin are combined in proportions ranging from about 10 to 90 per cent, more particularly from about 25 to 75 per cent, by weight of the former to from about 90 to 10 per cent, more specifically from about 75 to 25 per cent, by weight of the latter. Dielectric materials comprising a composition including essentially a substantially homogeneous mixture of the hereindescribed wax and resin within these proportions are particularly useful in the field of electrical insulation.

In cases where flexibility, especially at low temperatures, e. g., 0° C., is desired in my new wax-resin compositions or in flexible, permeable materials impregnated with such compositions, a plasticizer (preferably a flame-resisting plasticizer, e. g., tricresyl phosphate) should be incorporated into the composition. The amount of plasticizer may be varied as desired or as conditions may require. Ordinarily, however, the plasticized wax-resin compositions of this invention, e. g., hot-melt impregnating compounds, will comprise, by weight, from about 75 to 99 per cent of a mixture consisting of the synthetic wax and resinous composition broadly described in the second paragraph of this specification (and more specifically elsewhere herein) and from about 1 to 25 per cent of a plasticizer, e. g., tricresyl phosphate, for the said mixture. Illustrative examples of other plasticizers that may be used are dibutyl phthalate, dioctyl phthalate, dibenzyl sebacate, triphenyl phosphate, dicapryl phthalate, etc.

The plasticized and unplasticized wax-resin compositions of this invention have a wide variety of commercial applications. The plasticized compositions are especially valuable as saturants, either as hot-melt compounds or, dissolved in a solvent, as solution-type impregnants, for insulated wires and cables wherein the insulation comprises a flexible, permeable insulating material, e. g., asbestos, glass fibers, mineral wool, etc. They may be used in protectively covering metallic surfaces to prevent corrosion and in treating, for example, wood to prevent decay. The flame-resisting character of these compositions makes them especially suitable for use, along or with other ingredients, e. g., a volatile solvent, in coating or coating and impregnating fabric and other textile materials, e. g., materials comprising inorganic fibers, or natural or synthetic organic fibers. They may be employed in treating filaments, threads, yarns, etc., of cotton, silk, nylon, rayon, casein, polymeric vinylidene chloride, etc., or fabrics woven or otherwise formed from such materials or combinations thereof, in order to impart improved properties, e. g., a smooth, waxy, water- and flame-resisting finish, to the material undergoing treatment.

The wax-resin compositions of this invention also may be used as modifiers of other materials, e. g., paraffin wax, asphalt or other bituminous materials of petroleum or coal-tar origin to provide improved properties therein. They may be used as a dielectric material alone or in combination with other dielectrics, e. g., oils, or as an impregnant of, or otherwise combined with paper, Cellophane, cellulose esters, e. g., cellulose acetate, etc., cellulose ethers, e. g., ethyl cellulose, etc., natural and synthetic resins, etc.; as a component of varnishes, enamels, lacquers, paints and other liquid coating compositions; as an ingredient of furniture polishes, automobile polishes, floor polishes, etc.; and for numerous other purposes. Thus, they also may be employed without a solvent as an impregnant of electrical coils, especially those which, in use, do not become heated to temperatures above the melting point of the composition. This latter application is possible because, in general, my new wax-resin compositions have a viscosity at 150° C. comparable with the room-temperature viscosity of an impregnating varnish cut with a solvent.

What I claim as new and desire to secure by Letters Patent of the United States is:

1. A composition of matter comprising, by weight, (1) from 10 to 90 per cent of a synthetic wax comprising an N-substituted chlorophthalimide obtained by reacting under heat a mixture comprising a primary monoamine and a chlorinated compound selected from the class consisting of chlorinated phthalic acids and anhydrides, the said monoamine being present in a molar amount sufficient to form an N-substituted chlorophthalimide, and (2) from 90 to 10 per cent of a resinous composition comprising the product of reaction under heat of ingredients including a chlorinated compound selected from the class consisting of chlorinated phthalic acids and anhydrides as defined in (1) and a glycol which is present in from a 5 to 25 per cent molar excess over the chlorinated compound, said reaction product having at least in part chemically incorporated therein a modifying substance which is present in an amount equal to from 5 to 25 percent, by weight, of the total starting ingredients and which is selected from the class consisting of (a) fatty oils, (b) fatty acids having from 10 to 33 carbon atoms, inclusive, and (c) fats and waxes containing the fatty acids defined in (b), and said resinous composition of (2) being compatible with the synthetic wax of (1).

2. A composition of matter comprising, by weight, (1) from 10 to 90 per cent of a synthetic wax comprising an N-substituted chlorophthalimide obtained by reacting under heat a mixture comprising a primary monoamine and chlorinated phthalic anhydride, the said monoamine being present in a slight molar excess sufficient to form an N-substituted chlorophthalimide and (2) from 90 to 10 percent of a resinous composition comprising the product of reaction under heat of ingredients including a chlorinated phthalic anhydride and a glycol which is present in from a 5 to 25 per cent molar excess over the chlorinated phthalic anhydride, said reaction product having at least in part chemically incorporated therein from 5 to 25 percent, by weight, of the total starting ingredients of a modifying substance selected from the class consisting of (a) fatty oils, (b) fatty acids having from 10 to 33 carbon atoms, inclusive, and (c) fats and waxes containing the fatty acids defined in (b), and said resinous composition of (2) being compatible with the synthetic wax of (1).

3. A composition as in claim 2 wherein the chlorinated phthalic anhydride of (1) and (2) is tetrachlorophthalic anhydride.

4. A hot-melt impregnating compound comprising, by weight, from about 75 to 99 per cent of a mixture consisting of the following compatible ingredients: a synthetic wax and a resinous composition each as defined and in the proportions as stated in claim 1; and from about 1 to 25 per cent of a plasticizer for the said mixture.

5. A composition comprising, by weight, (1) from 10 to 90 per cent of a synthetic wax comprising an N-substituted tetrachlorophthalimide obtained by reacting under heat a mixture comprising a primary monoamine and tetrachlorophthalic anhydride, the same monoamine being present in a slight molar excess sufficient to form the N-substituted tetrachlorophthalimide, and (2) from 90 to 10 per cent of a resinous composition comprising the product of reaction under heat of ingredients including a glycol, tetrachlorophthalic anhydride, and a fatty acid having from 10 to 33 carbon atoms, inclusive, the said glycol being present in from a 5 to 25 per cent molar excess over the tetrachlorphthalic anhydride, and the said fatty acid being present in an amount equal to from 5 to 25 per cent, by weight, of the total starting ingredients.

6. A composition as in claim 1 wherein the synthetic wax is obtained by effecting reaction under heat between tetrachlorophthalic anhydride and a mixture of primary monoamines including essentially a plurality of primary nonoamyl amines having an initial boiling point of at least 84° C., at least 95 per cent distilling off below 100° C. and a final boiling point not higher than 110° C., wherein the mixture of monoamines is present in a slight molar excess sufficient to form the mixture of N-substituted tetrachlorophthalimides.

7. A composition as in claim 1 wherein the resinous composition comprises the product of reaction of a glycol, tetrachlorophthalic anhydride and stearic acid.

8. A dielectric material comprising a composition including essentially a homogeneous mixture of, by weight, from about 10 to 90 per cent of the synthetic wax defined in claim 1 and from about 90 to 10 per cent of the resinous composition defined in claim 1.

9. A hot-melt, impregnating compound comprising, by weight, (1) from 10 to 90 per cent of a synthetic wax comprising a mixture of N-substituted tetrachlorophthalimides and being the product of reaction under heat between tetrachlorophthalic anhydride and a mixture of primary monoamines including essentially a plurality of monoamyl amine having an initial boiling point of at least 84° C., at least 95 per cent distilling off below 100° C., and a final boiling point not higher than 110° C., the said mixture of monoamyl amines being present in a slight molar excess sufficient to form the mixture of N-substituted tetrachlorophthalimides, and (2) from 90 to 10 per cent of a resinous product of reaction under heat of ethylene glycol, tetrachlorophthalic anhydride, and stearic acid, the said glycol being present in from a 5 to 25 per cent molar excess over the tetrachlorophthalic anhydride, and the stearic acid being present in an amount equal to from 5 to 25 per cent, by weight, of the total starting ingredients.

10. A hot-melt impregnating compound as in claim 9 which includes in addition about 5 to 25 per cent, by weight of the compound, of tricresyl phosphate.

11. An impregnating compound comprising, by weight, (1) from 35 to 45 per cent of a synthetic wax comprising an N-substituted tetrachlorophthalimide and being the product of reaction under heat between tetrachlorophthalic anhydride and a mixture of primary monoamines including the following mixed primary monoamyl amines: tertiary amyl amine, secondary isoamyl amine, 2-aminopentane, 3-aminopentane, active amyl amine, isoamyl amine, and normal amyl amine, said mixed monoamyl amines have an initial boiling point of at least 84° C., at least 95 per cent distilling off below 100° C., and a final boiling point not higher than 110° C.; the said mixture of monoamyl amines being present in a slight molar excess sufficient to form the mixture of N-substituted tetrachlorophthalimides, (2) from 45 to 55 per cent of the resinous product of reaction under heat of a mixture comprising ethylene glycol, tetrachlorophthalic anhydride, and stearic acid, the said glycol being present in from a 5 to 25 per cent molar excess over the tetrachlorophthalic anhydride, and the said stearic acid being present in an amount equal to from 5 to 25 per cent, by weight, of the total starting ingredients, said resinous reaction product being compatible with the synthetic wax of (1), and (3) tricresyl phosphate constituting the remainder.

12. A product comprising a flame-resisting composition which is a homogeneous mixture of ingredients including, by weight, (1) from 10 to 90 per cent of a synthetic wax comprising an N-substituted tetrachlorophthalimide obtained by reacting under heat a mixture comprising a primary monoamine having from 1 to 18 carbon atoms, inclusive, and tetrachlorophthalic anhydride, the said primary monoamine being present in a slight molar excess sufficient to form the N-substituted tetrachlorophthalimide, and (2) from 90 to 10 per cent of a resinous composition compatible with the synthetic wax of (1), said resinous composition comprising the product of reaction under heat of a glycol and tetrachlorophthalic anhydride wherein the glycol is present in from a 5 to 25 per cent molar excess over the tetrachlorophthalic anhydride, said resinous reaction product having at least in part chemically combined therein a modifying substance selected from the class consisting of (a) fatty oils, (b) fatty acids having from 10 to 33 carbon atoms, inclusive, and (c) fats and waxes containing the fatty acids defined in (b), the chosen glycol and modifying substance and the proportions of glycol, tetrachlorophthalic anhydride and modifying substance being such that the said resinous composition of (2) contains at least 30 per cent, by weight, of chlorine, and the modifying substance is present in an amount equal to from 5 to 25 per cent, by weight, of the total starting ingredients.

13. An insulated electrical conductor wherein the insulation comprising fibrous material coated and impregnated with a flame-resisting homogeneous mixture of ingredients including, by weight, (1) from 35 to 45 per cent of a synthetic wax comprising an N-substituted tetrachlorophthalimide obtained by reacting under heat a mixture comprising a primary monoamine containing from 3 to 12 carbon atoms, inclusive, and tetrachlorophthalic anhydride, the said monoamine being present in a slight molar excess sufficient to form the N-substituted tetrachlorophthalimide, (2) from 45 to 55 per cent of a resinous composition compatible with the synthetic wax of (1), said resinous composition comprising the product of reaction under heat of a glycol, tetrachlorophthalic anhydride and a fatty acid having from 14 to 30 carbon atoms, inclusive, wherein the glycol is present in from a 5 to 25 per cent molar excess over the tetrachlorophthalic anhydride, the chosen glycol and modifying substance and the proportions of glycol, tetrachlorophthalic anhydride and fatty acid being such that the said composition contains at least 30 per cent, by weight, of chlorine, and the fatty acid is present in an amount equal to from 5 to 25 per cent, by weight, of the total starting ingredients, and (3) from 5 to 25 per cent, by weight, of the said mixture of a flame-resisting plasticizer for the aforementioned mixed ingredients.

14. An insulated electrical conductor wherein the insulation comprises asbestos coated and impregnated with the impregnating compound of claim 11.

GEORGE J. BOHRER.

REFERENCES CITED

The following references are of record in the file of this patent:

UNITED STATES PATENTS

| Number | Name | Date |
| --- | --- | --- |
| 2,028,716 | Delaney | Jan. 21, 1936 |
| 2,072,770 | Reid | Mar. 2, 1937 |
| 2,106,523 | Ellis | Jan. 25, 1938 |
| 2,298,295 | Hyatt | Oct. 13, 1942 |
| 2,354,110 | Ford | July 18, 1944 |
| 2,370,046 | Keyes | Feb. 20, 1945 |

FOREIGN PATENTS

| Number | Country | Date |
| --- | --- | --- |
| 119,712 | Australia | Mar. 14, 1945 |

Certificate of Correction

Patent No. 2,443,887.

June 22, 1948.

GEORGE J. BOHRER

It is hereby certified that errors appear in the printed specification of the above numbered patent requiring correction as follows: Column 2, line 34, strike out the word "should", second occurrence; column 7, line 20, for "Tetrahlorophthalic" read *Tetrachlorophthalic*; column 8, line 19, for "scribed" read *described*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*